United States Patent
Regensburger et al.

(10) Patent No.: US 12,523,468 B2
(45) Date of Patent: Jan. 13, 2026

(54) DETERMINING A POSITION OF A TREATMENT INSTRUMENT TO PERFORM A TREATMENT ON AN OBJECT

(71) Applicant: Siemens Healthcare GmbH, Erlangen (DE)

(72) Inventors: Alois Regensburger, Poxdorf (DE); Daniel Ploss, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 252 days.

(21) Appl. No.: 18/523,489

(22) Filed: Nov. 29, 2023

(65) Prior Publication Data

US 2024/0210169 A1    Jun. 27, 2024

(30) Foreign Application Priority Data

Dec. 21, 2022    (DE) .................... 10 2022 214 227.6

(51) Int. Cl.
    G01B 15/00    (2006.01)
(52) U.S. Cl.
    CPC .................... G01B 15/00 (2013.01)
(58) Field of Classification Search
    CPC ...................................... G01B 15/00
    See application file for complete search history.

(56) References Cited

U.S. PATENT DOCUMENTS

2007/0001905 A1* 1/2007 Eronen .................... G01S 5/02
                                                  342/463
2009/0076373 A1  3/2009 Maschke

FOREIGN PATENT DOCUMENTS

| DE | 102007043731 A1 | 4/2009 |
| DE | 102008050838 A1 | 10/2009 |
| DE | 102011006562 A1 | 10/2012 |
| DE | 102011006574 A1 | 10/2012 |

OTHER PUBLICATIONS

Schlöder EMC, "IEC 60601-1-2 ED. 4.1 / IEC 61000-4-39." Jun. 2018. pp. 1-11. Obtained: https://absolute-emc.com/uploads/files/1640266870_DS-New_requirements_for_IEC_60601-1-2_01.pdf.
Yaffe, M. J., and J. A. Rowlands. "X-ray detectors for digital radiography." Physics in Medicine & Biology 42.1 (1997): 1-39.

* cited by examiner

Primary Examiner — Kiho Kim
(74) Attorney, Agent, or Firm — Lempia Summerfield Katz LLC (57) ABSTRACT

An X-ray device is provided that includes: an X-ray source configured to provide the X-ray radiation; an X-ray detection unit configured to detect secondary X-ray radiation at least partially transmitted through the object and/or at least partially dispersed by the object, and to provide at least one detector signal as a function of the detected secondary X-ray radiation; and an X-ray analyzer unit configured to analyze the at least one detector signal in order to determine a structure of the object at least in part. The X-ray detection unit is further configured to receive a radio signal, e.g., from a transmitter unit of the treatment instrument positioned in a predefined area of the object and, as a function of the detected radio signal, to provide at least one received signal or analysis by a radio analyzer unit to determine a position of the treatment instrument in relation to the object.

15 Claims, 3 Drawing Sheets

DETERMINING A POSITION OF A TREATMENT INSTRUMENT TO PERFORM A TREATMENT ON AN OBJECT

The present patent document claims the benefit of German Patent Application No. 10 2022 214 227.6, filed Dec. 21, 2022, which is hereby incorporated by reference in its entirety.

TECHNICAL FIELD

The disclosure relates to a method to determine a position of a treatment instrument to perform a treatment on an object. The disclosure further relates to an X-ray device used to expose an object to X-ray radiation. Finally, the disclosure relates to a use of an X-ray detection unit, which has photosensitive elements that may be coupled at least selectively in part with an X-ray analyzer unit using electrical wires in each case.

BACKGROUND

Generic methods and X-ray devices are known extensively in prior art, making separate documentary evidence unnecessary in this regard. X-ray devices are used to perform an X-ray examination on the object, in order to determine a structure of the object at least in part. The same applies to generic methods. These are frequently used in material testing, but also in the field of diagnostics with biological material, living organisms, or similar. Therefore, the object may be a subject matter resulting from an industrial manufacturing process, but also a degradation product from mining, a body of a living organism, or similar.

The X-ray detection unit is used during the X-ray examination to detect secondary X-ray radiation at least partially transmitted through the object, partially absorbed by the object, and/or at least partially dispersed by the object, and to provide at least one detector signal as a function of the detected secondary X-ray radiation. The detector signal may be analyzed by an X-ray analyzer unit in order to be able to determine the structure of the object at least in part. X-ray detection units, as they are used in X-ray devices and generic methods, are disclosed, for example, by M. H. Yaffe and H. A. Rowlands in X-Ray Detectors for Digital Radiography, in Phys. Med. Biol. 42 (1997), pages 1 to 39.

X-ray devices may vary widely in design. A particularly advantageous X-ray device is one that is suitable for X-ray tomography, wherein digital sectional images are determined from absorption values of X-ray radiation through the object, with the X-ray radiation acting on the object from different directions, for example, from which digital sectional images the structure of the object may be seen. In the case of conventional X-ray methods, it is usual to expose the object being examined to X-ray radiation, to receive the secondary X-ray radiation by an X-ray detection unit, and to analyze the at least one detection signal by an X-ray analyzer unit. The at least one detector signal may be an electrical signal, such as an analog or digital electrical signal. The X-ray analyzer unit may have electronic hardware wiring and/or a program-controlled computer unit for the analysis. The X-ray analyzer unit may also have interfaces to provide the analysis and/or output devices to output the analysis.

Absorption profiles of the object from multiple spatial directions are also created in computed tomography, for example. This likewise allows the structure of the object to be determined. Computer-aided image reduction may be used, for example, to determine a specific absorption level for a defined volume element of the object, allowing the spatial structure of the object to be determined. X-ray tomography is an imaging method that may be used to depict a layer within the examined object, for example.

X-ray examinations are now frequently performed on the object in combination with treatments, with a treatment instrument coming into contact with and/or being inserted into the object, for example, allowing a predefined treatment to be performed. In the case of medical treatments, it is desirable to be able to determine the position and/or orientation of the treatment instrument in relation to the object, for example, within the object. An X-ray image may be created for this purpose, for example, showing the treatment instrument. Furthermore, it is also possible to determine the position and/or orientation of the treatment element in a similar way optically or using electromagnetic fields. This may require additional devices that are not part of X-ray generators.

SUMMARY AND DESCRIPTION

The object of the disclosure is to improve the determination of the position of the treatment instrument being used to perform the treatment on the object, on whom the X-ray examination is being performed.

The scope of the present disclosure is defined solely by the appended claims and is not affected to any degree by the statements within this summary. The present embodiments may obviate one or more of the drawbacks or limitations in the related art.

In relation to a method as disclosed herein, an X-ray detection unit may be used as a radio receiver unit, and the radio analyzer unit may receive the at least one received signal from the X-ray detection unit.

In relation to an X-ray device as disclosed herein, an X-ray detection unit may be configured to receive a radio signal, which may be transmitted by a transmitter unit of the treatment instrument arranged in a predefined area of the object and, as a function of the detected radio signal, to provide at least one received signal for analysis by a radio analyzer unit, wherein the radio analyzer unit is configured to analyze the at least one received signal, in order to determine a position of the treatment instrument in relation to the object.

In another embodiment, a use of an X-ray detection unit is provided, which has photosensitive elements that may be coupled at least selectively in part with an X-ray analyzer unit by way of electrical wires in each case, wherein the X-ray detection unit receives a radio signal, which is transmitted by a treatment instrument arranged in an area of an object, and wherein the X-ray detection unit provides at least one received signal as a function of the detected radio signal for analysis by a radio analyzer unit, wherein the radio analyzer unit analyzes the at least one received signal, in order to determine a position of the treatment instrument in relation to the object.

The disclosure is based, inter alia, on the knowledge that the X-ray detection unit is able to receive radio signals due to its mechanical and electrical design. Such radio signals may be unwelcome in standard X-ray examinations because they may have an undesirable effect on the detection of secondary X-ray radiation. However, the disclosure takes advantage of the fact that the effect of these radio signals on the X-ray detection unit may be used to determine the position of the treatment instrument in relation to the object. The position of the treatment instrument not only refers to a spatial position, but rather may alternatively or additionally also include an orientation of the treatment instrument.

Accordingly, a concept behind the disclosure is to make dual use of the X-ray detection unit, namely, to detect the secondary X-ray radiation in an operating state in which the x-ray detection unit is adjusted in order to detect the secondary X-ray radiation, and likewise to receive radio signals by adjusting the X-ray detection unit to receive radio signals in a further operating state.

Depending on the design of the X-ray detection unit, the X-ray detection functionality and the radio reception functionality may be executed in parallel at least temporarily. Alternatively, the X-ray detection functionality and the radio reception functionality may be executed at separate times. An X-ray detection unit that is suitable for this function is disclosed, for example, in DE 10 2008 050 838 A1. Little effort is required to modify the X-ray detection unit for signal coupling with the radio receiver unit. The X-ray detection unit may have photosensitive elements that use photodiodes based on amorphous silicon.

The disclosure thus makes it possible to dispense with the separate radio receiver unit or a separate field generator required in the prior art. As a result, this not only saves on costs and installation space but may also similarly reduce the effort required with the X-ray device or in the surrounding area. It is also possible to avoid arranging and/or handling a separate unit for radio reception. The disclosure allows the radio receiver unit to be integrated into the existing design of the X-ray device so that the radio receiver unit has less impact on the function of the X-ray device. This is particularly advantageous for X-ray examinations combined with treatment.

The X-ray device may be a conventional X-ray device that is used to facilitate X-ray images in the manner of an individual X-ray image. Alternatively, the X-ray device may be an X-ray device that allows at least partial tomographic imaging using X-ray radiation, such as an X-ray computed tomography unit (CT) or a C-arm with an option for cone beam computed tomography (CBCT).

The X-ray detection unit has a material that interacts with X-ray radiation, emitting light as a result of this interaction. This light is detected by the photosensitive elements that provide an electrical signal as a function of the detected light. Photosensitive elements of this type may be photodiodes, phototransistors, photoresistors, and/or similar. The photosensitive elements may be arranged next to one another in at least one plane in the manner of a matrix. The plane may have an at least partially angular, rectangular, or round shape. In the case of a rectangular shape, at least one edge measurement may be selected in a range of 15 cm to 40 cm, for example. The photosensitive elements may be arranged in columns and rows, for example. In one embodiment, 120 rows and/or columns may be provided, for example. By suitable electronic wiring via electrical wires, one or more detector signals may be provided, which may be transmitted to the X-ray analyzer unit for analysis. The X-ray analyzer unit processes the detector signals in order to determine the structure of the object. The structure may be a geometric structure. The structure may also be a material structure, e.g., a tissue structure or similar.

The object is exposed to the X-ray radiation. It may be provided that the object is exposed to X-ray radiation from different directions. As a reaction to the X-ray exposure, secondary X-ray radiation emanates from the object, which result from dispersal, absorption, or the X-ray radiation is at least partially transmitted through the object. This secondary X-ray radiation is detected at least partially by the X-ray detection unit with the at least one detection signal being provided depending on the detected secondary X-ray radiation. Treatment with the treatment instrument may be undertaken at least partially while the X-ray examination is being performed.

In order to determine the position of the treatment instrument, the treatment instrument has a transmitter unit configured to transmit the radio signal. The radio signal may be a continuous signal that is transmitted at a predefined fixed frequency and at a predefined and constant amplitude. Alternatively, the frequency or the amplitude may be varied. The variation may be made in the course of adjusting the settings of the transmitter unit.

The transmitter unit may be an electronic transmitter unit and may be arranged as a separate entity on the treatment instrument. The transmitter unit may be firmly bonded to the treatment instrument for this purpose, for example. The connection between the transmitter unit and the treatment instrument may be a detachable connection. Suitable connection devices may be provided for this purpose, facilitating a correspondingly detachable mechanical connection, such as screws, clamps, locking connections, and/or similar, for instance. It is particularly advantageous if the transmitter unit is integrated at least partially, (e.g., entirely), in the treatment instrument. This allows a compact unit to be created that is not only used for treatment, but the position of which may also be determined at the same time by the transmitter unit.

The transmitter unit may have at least one electronic oscillator, for example, which stimulates an electronic oscillating circuit to oscillate appropriately in a specifiable manner, which may have an antenna element, so that a radio signal is emitted. The oscillator may be configured to be adjustable. The radio signal transmitted by the transmitter unit may be received by the radio receiver unit or the X-ray detection unit.

The treatment element may be a treatment needle, an endoscope, an ultrasound probe, a scalpel, an electric cautery pen, an autonomous mini robot, and/or similar.

The X-ray detection unit does not need to have only one layer of photosensitive elements. In certain examples, two or more layers of photosensitive elements may be provided, which may be arranged directly adjacent to one another. If several layers of photosensitive elements are provided, these layers may be offset relative to one another so that the photosensitive elements of adjacent layers are arranged offset to one another.

It is further proposed that the X-ray detection unit has signal terminals for electrical coupling with the X-ray analyzer unit, to which the X-ray detection unit provides the at least one detector signal and the at least one received signal. The signal terminals are coupled at least temporarily at least with the X-ray analyzer unit or with the radio analyzer unit. The disclosure may thus be realized using the signal terminals, as they enable an optional connection to the respective analyzer unit via suitable electrical structures, for example. Alternatively, the signal terminals may be permanently coupled to the X-ray analyzer unit and the radio analyzer unit, with the X-ray analyzer unit and the radio analyzer unit being active on an alternate basis, for example. In certain examples, the X-ray analyzer unit and the radio analyzer unit may also be active in parallel at least temporarily. The signal terminals are electrically coupled with the photosensitive elements. As a result, not only the at least one detector signal, but also the at least one received signal may be provided at the signal terminals. Use of the signal terminals may be shared by the X-ray analyzer unit and radio analyzer unit at least in part. In certain examples, separate signal terminals may be provided for the X-ray analyzer unit and the radio analyzer unit.

In certain examples, the signal terminals are only coupled with the X-ray analyzer unit in an initial operating state of the X-ray device and the signal terminals are only coupled with the radio analyzer unit in a second operating state of the X-ray device, which differs from the initial operating state. As a result, alternating operation may be achieved of the X-ray detection unit due to the initial and second operating state, namely either detection of the secondary X-ray radiation taking place, or detection of the radio signal. Interference-suppressed dual use of the X-ray detection unit may be achieved in this way. A switching unit may be provided for this purpose, which may be used to couple the signal lines with the X-ray analyzer unit and the radio analyzer unit in each case.

The transmitter unit may be configured to transmit the radio signal at one or more predefined frequencies. The predefined frequency may be selected from a frequency in a range of 100 kHz to 200 kHz. The frequency may also be higher, and may be 1 MHz or more, for example. Provision may be made for precisely one predefined frequency to be provided. The antenna, (e.g., when arranged within the object), may be configured to transmit the radio signal not only continuously (e.g., continuous wave) at a frequency in a range of 100 kHz to 200 kHz, for example, but to also be able to transmit the radio signal in pulses. This means that the at least one frequency is transmitted in pulses over time. A pulse or repeat frequency may be in a range of 1 kHz to 50 kHz, for example. Pulsed radio signals may generate hysteresis in the detector through induction and may even amplify the signal detection in the X-ray detection unit. Depending on the application, however, multiple different predefined frequencies may also be provided for the radio signal. It may be provided that the radio signal has multiple frequencies at the same time. The frequency and/or an amplitude of the radio signal may be selected as needed for the desired function on the object being examined. The frequency may be selected depending on the object and the X-ray device.

The transmitter unit may transmit the radio signal at multiple predefined frequencies. In certain examples, the radio signal may be transmitted at multiple frequencies at least temporarily at the same time. In other examples, the transmitter unit transmits the radio signal at multiple different predefined frequencies one after the other, so that the radio signal is only transmitted at a single frequency at any given time.

It is particularly advantageous if the transmitter unit varies the frequency of the radio signal within a predefined frequency range. The variation may include a predefined change over time, such as in the form of a chirp or similar. The frequency may be varied within a predefined time range. The change in frequency in the time range may be repeated in a subsequent time range. For example, the frequency may have a lower frequency value at the beginning of the predefined time range and an upper frequency value at the end of the time range. The change in frequency over time may be linear or non-linear.

In certain examples, the at least one frequency is adjusted. The frequency may be adjusted separately for each examination. When adjusting the frequency, the type of examination and the object or type of object may be taken into account. Adjustment of the at least one frequency may also include which frequency (if multiple frequencies are used), which value the different frequencies have, and in what way the frequency may be changed, if applicable. Determining the position of the treatment instrument may be improved in this way.

The X-ray radiation is provided in at least an initial predefined period in which the transmission of the radio signal is halted, and/or the radio signal is transmitted within at least a second predefined period in which the provision of the X-ray radiation is halted. The interference immunity of the X-ray detection functionality and the radio reception functionality may be improved as a result. Additionally, the disclosure may also be realized with already existing X-ray detection units, especially also retrospectively with an existing X-ray device. The first predefined time range and the second predefined time range do not have to be the same length. For example, the first predefined time range may be 0.5 seconds, 2 seconds, or 2 seconds or more. The second time range may be 0.5 seconds or less, for example. In certain examples, the first time range may be longer than the second time range.

In certain examples, the radio signal is transmitted at a different time to the supply of the X-ray radiation. This makes it possible to achieve good decoupling of the function in respect of determining the position of the treatment instrument and performing the X-ray examination. The times may be chosen so that they do not overlap.

In certain examples, the X-ray detection unit is moved at least partially in relation to the object and that at least the radio signal is detected at two or more different positions of the X-ray detection unit in relation to the object. It is possible as a result to receive the radio signal from different directions, so as to improve the determination of the position of the treatment instrument. It is particularly advantageous that three-dimensional positioning of the treatment instrument may hereby be determined, which is also particularly advantageous in determining the orientation of the treatment instrument. It is particularly advantageous that the X-ray detection unit may be moved around the object on a curved path, e.g., a circular path. The movement may include at least one full circuit around the object. The radio signal is detected at two or more positions of the X-ray detection unit in relation to the object during the circling of the object. More than two positions of the X-ray detection unit are advantageously provided, however, to detect the radio signal. The determination of the position of the treatment instrument may be further improved in this way.

In relation to the X-ray device, the X-ray detection unit has photosensitive elements that may be coupled at least selectively in part with the X-ray analyzer unit using electrical wires in each case, with the X-ray detection unit being embodied to couple the respective electrical wires with the radio analyzer unit. The additional connection of the radio analyzer unit to the X-ray detection unit may be realized in this way, in order to facilitate use of the radio reception capacity of the X-ray detection unit. The electrical wires may be arranged in parallel and/or on a plane, which is at least parallel to a plane on which the photosensitive elements are arranged. The spacing of adjacent electrical wires may be selected to match a wavelength of the at least one frequency of the transmitter unit. It may also be provided, however, that the at least one frequency of the transmitter unit is selected to match the spacing of second adjacent electrical wires. This may further improve the radio reception capacity of the X-ray detection unit. In certain examples, the spacing of adjacent wires is 120 micrometers ($\mu$m). In other examples, the spacing may also be 2.5 $\mu$m or less.

Moreover, the X-ray detection unit is configured to couple the respective electrical wires with the X-ray detection unit or with the radio analyzer unit depending on the operating state in each case. For this purpose, the X-ray detection unit may have an electrical switching unit, to which are connected not only the electrical wires, but also the radio analyzer unit and the X-ray analyzer unit. The switching unit may have analog switches, digital switches, electromechanical switches, or similar. The respective coupling may be realized as a result.

According to a development, the X-ray detection unit is configured to couple the respective electrical wires with the X-ray analyzer unit or with the radio analyzer unit as a function of an operating state signal in each case. The operating state may be set using the operating state signal. In this way, the switching unit may be switched to a corresponding switching state using the operating state signal. In some examples, the operating state signal may be used to activate or deactivate the transmitter unit and/or the X-ray source accordingly. This may further improve operation as intended for the X-ray examination and also for determination of the position of the treatment instrument. The operating state signal may also be used to synchronize the X-ray source, the transmitter unit, and the coupling with the X-ray analyzer unit and the radio analyzer unit.

In certain examples, in a predefined third time period, both the X-ray analyzer unit and the radio analyzer unit may be tested or calibrated. Depending on the test or the calibration, settings may then be made on the radio analyzer unit or the X-ray analyzer unit and, if necessary, also on the transmitter unit and/or the X-ray source, in order to further improve each intended function. The predefined third time period may be repeated at regular intervals, for example. In certain examples, the predefined third time period is executed at the start and/or at the end of a treatment of the object. The predefined third time period may be provided when the object is not yet positioned in the area of the X-ray device. In certain examples, the predefined third time period may be selected so that testing or calibration may be performed with the object or without the object. This may further improve the quality of the testing or calibration.

The features and feature combinations mentioned above in the description, and the features and feature combinations mentioned below in the description of the figures and/or just shown in the figures, are not only usable in each specified combination, but also in other combinations without going beyond the scope of the disclosure.

The features and feature combinations mentioned above in the description, and the features and feature combinations mentioned in the following description of embodiments and/or just shown in the figures, are not only usable in each specified combination, but also in other combinations. Thus, embodiments are also included in the disclosure, or may be deemed disclosed, that are not explicitly shown in the figures and explained, but that result from, and may be produced from, the explained embodiment variations by way of separate feature combinations. The features, functions, and/or effects represented by the exemplary embodiments may in themselves each represent individual features, functions, and/or effects of the disclosure that may be considered independently of one another and that also develop the disclosure independently of one another. Embodiments are therefore also intended to include combinations other than those in the explained embodiment variations. Moreover, the described embodiment variations may also be supplemented by further features, functions, and/or effects of the disclosure that have already been described.

BRIEF DESCRIPTION OF THE DRAWINGS

In the figures, the same reference signs refer to the same features or functions.

DETAILED DESCRIPTION

Figure 1:
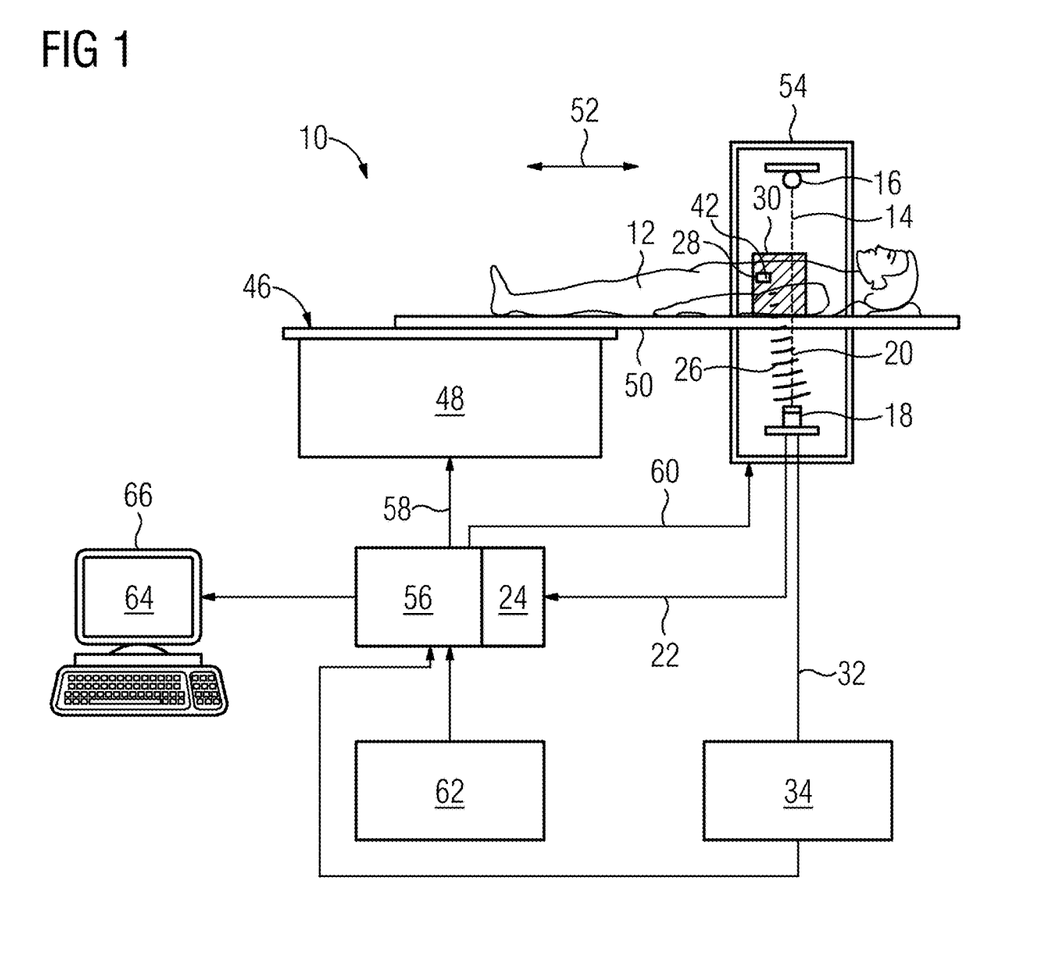
FIG. 1 is a schematic representation of an example of an X-ray computed tomography unit with an X-ray measuring system, which has an X-ray detection unit, to which an X-ray analyzer unit and a radio analyzer unit are connected.

FIG. 1 shows a schematic representation of an X-ray device 10, which is embodied as an X-ray computed tomography unit (CT) in the present case. In the embodiment described below, the X-ray device 10 is configured to perform an X-ray examination on a patient. However, the X-ray device 10 is not limited to use with patients and may be used accordingly with any objects, such as in material testing or similar.

The X-ray device 10 has a patient positioning apparatus 46, which in turn has a traversing table 48 and a patient table 50 that may be moved in a longitudinal direction 52 in relation to the traversing table 48. The patient positioning apparatus 46 may be used to position a patient 12 lying on the patient table 50 in a longitudinal direction 52 in a through opening of a gantry 54. The gantry 54 is a short ring tunnel, which is formed by the through opening and in which an examination area 30 of the patient 12 is arranged for the performance of the X-ray examination. The patient may be positioned in the predefined manner through a central opening of the gantry 54 using the traversing table 48, so that on the one hand the examination area 30 may be well exposed to the X-ray radiation 14 and, on the other hand, the secondary X-ray radiation 20 may be well detected by an X-ray detection unit 18.

An X-ray source 16, which is used to output the X-ray radiation 14, is arranged in a ring area of the gantry 54 surrounding the through hole.

The X-ray detection unit 18 is arranged radially opposite in the ring area. The X-ray detection unit 18 has a number of photosensitive elements 36 facing the inner side of the through opening of the gantry 54 (FIG. 3). The photosensitive elements 36 are embodied as photodiodes in the present case and are arranged in the X-ray detection unit 18, as explained by FIG. 2 and FIG. 3. The function and arrangement and the structure of the X-ray detection unit are described, for example, in DE 10 2008 050 838, for which reason reference is also made to the embodiments described therein.

As is apparent from FIG. 1, the X-ray device 10 also has a control unit 56, which provides a control signal 58, which may be used to position the patient table 50 in the gantry 54. The control unit 56 also provides a control signal 60, which is used, inter alia, to control a synchronized movement of the X-ray source 16 and the X-ray detection unit 18 in the gantry 54.

The X-ray device 10 also has a user interface 62, which may be used to predefine the control signals 58, 60 at least partially. The user interface 62 may have a joystick, a computer mouse, a keyboard, combinations of the same, and/or similar.

The examination area 30 of the patient 12 is examined by the patient 12 being slid in a longitudinal direction 52 into the gantry 54 using the patient table 50. During this movement, the X-ray source 16 and the X-ray detection unit 18 may move around the patient 12 in a circular motion and in a synchronized manner. The X-ray source 16 emits the X-ray radiation 14 that penetrates the examination area 30 of the patient 12. The X-ray radiation 14 in the examination area 30 of the patient 12 is partially absorbed, dispersed, and/or deflected, so that the secondary X-ray radiation 20 exits on the opposite side of the examination area 30. The secondary X-ray radiation 20 may be detected by the X-ray detection unit 18. The X-ray detection unit 18 provides corresponding detector signals 22 that are sent to the X-ray analyzer unit 24. This performs a corresponding analysis of the detector signals 22 and transmits analyzed data to the control unit 56. This data may be processed further in the control unit 56, in order to convert projection images into image information 64, for example. The control unit 56 may transmit the image information 64 to a display unit 66, which facilitates a graphic visual display for a user of the X-ray device 10.

As is apparent from FIG. 1, an endoscope 28 as treatment instrument is arranged in the examination area 30 of the patient 12. The endoscope 28 has a transmitter unit 42, which may be used to transmit radio signals. As further explained below, these radio signals may be received by the X-ray detection unit 18 and sent to a radio analyzer unit 34, which determines the position data of the endoscope 28, including an exact position and orientation of the endoscope 28. This data is transmitted to the control unit 56. The control unit 56 may consider this data to provide the image information 64. As a result, it is possible to represent not only the examination area 30, in particular its structure, but at the same time also to show within the representation of the examination area 30, at which position and in which orientation the endoscope 28 is arranged in the examination area 30.

This may remove the need for a separate radio receiver unit.

Because it receives the radio signal 26, the X-ray detection unit 18 in the present case is embodied to provide a received signal 32 for the radio analyzer unit 34, which is explained in more detail below.

Figure 2:
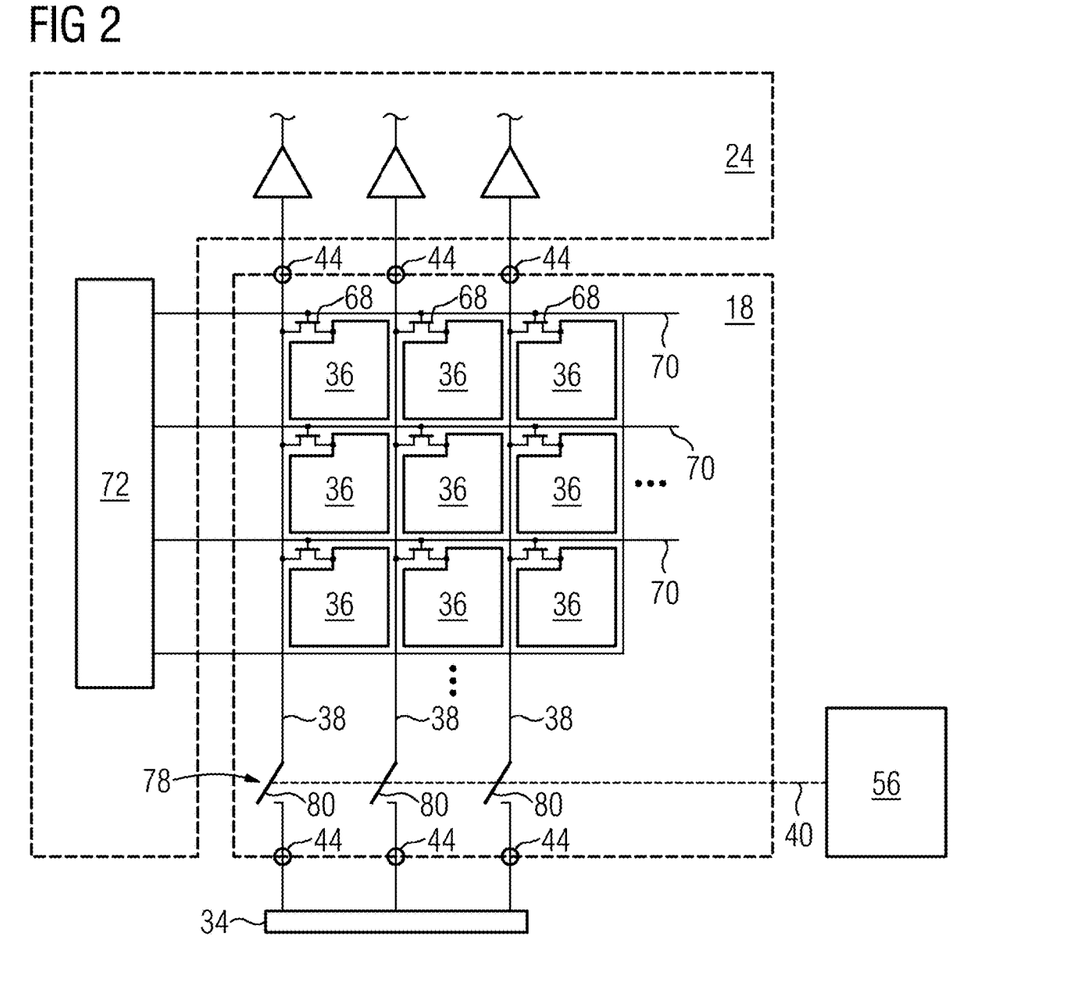
FIG. 2 is a schematic block diagram of an example of a section of a matrix of photosensitive elements of the X-ray detection unit.
Figure 3:
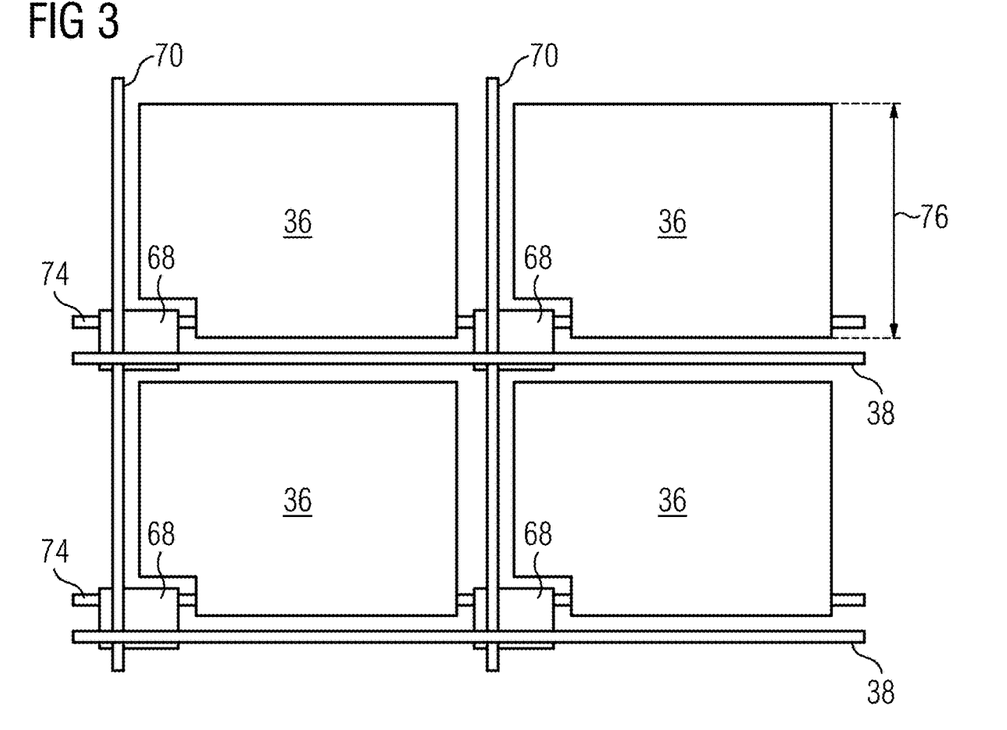
FIG. 3 is a schematic mechanical representation of an example of an area of four photosensitive elements of the representation of FIG. 2 arranged adjacent to one another.

FIG. 2 and FIG. 3 show a schematic layout in the area of the photodiodes 36, which may be used to provide the detector signals 22. FIG. 2 shows a schematic circuit diagram in which the photodiodes 36 are arranged side by side in a grid on a plane. Each photodiode 36 thus represents one photosensitive element. It is apparent that each photodiode 36 is connected to a transistor 68, with the photodiode 36 being connected to a respective electrical wire 38 as a function of a switching state of the transistor 68 operated in switching mode.

The electrical wires 38 have signal terminals 44 at their ends. The signal terminals 44 are electrically connected via further electrical wires to the X-ray analyzer unit 24, which amplifies, digitizes, and then further processes the respective detector signals 22.

The transistors 68 have unmarked control ports that are electrically connected to the respective control lines 70. The control lines 70 are connected to a readout controller of the X-ray analyzer unit 24. The transistors 68 are selectively switched via the control lines 70 with respect to their desired switching state. The X-ray analyzer unit 24 thus facilitates a batchwise readout of the photodiodes 36 arranged next to one other in a horizontal row, in order to generate the at least one detector signal 22. The X-ray analyzer unit 24 may realize corresponding synchronization here at the same time.

FIG. 3 shows a mechanical section of the arrangement shown in FIG. 2 with only four photodiodes 36 arranged directly adjacent to one other being shown. It is apparent from FIG. 3 that the electrical wires 38 are arranged parallel to one other on the plane. Adjacent electrical wires 38 are spaced about 150 µm apart in the present case. The spacing may be varied or adjusted as needed.

It is also apparent from FIG. 3 that the transistors 68 each have a reference potential connection 74.

Figure 4:
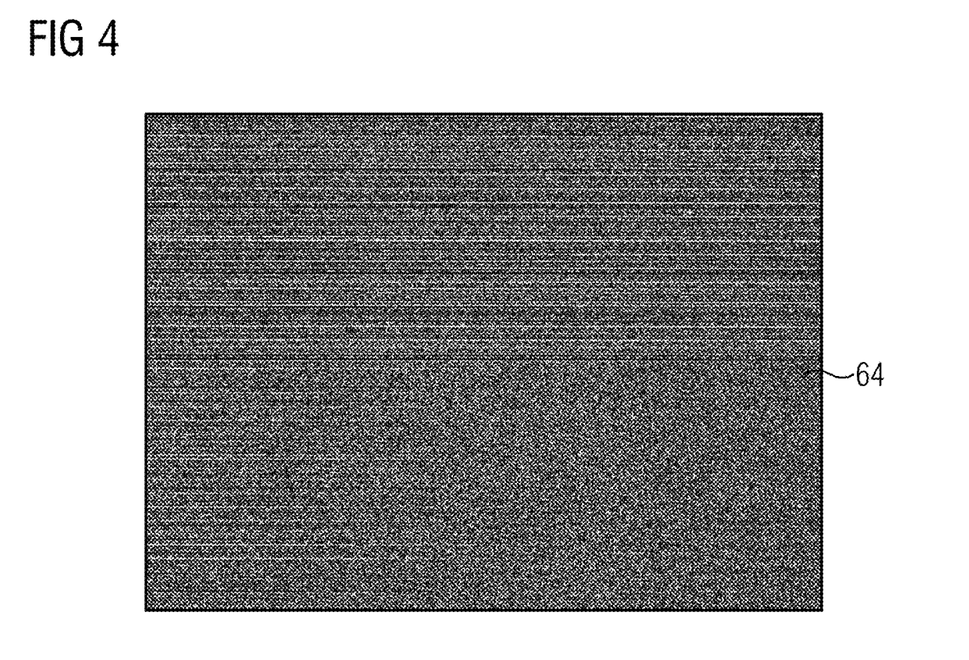
FIG. 4 is a schematic representation of an example of image information resulting from the X-ray analyzer unit's analysis of detection signals from the X-ray detection unit, when the X-ray source is deactivated, and a radio signal is received instead via the X-ray detection unit.

It is apparent from the mechanical layout shown in FIG. 3 that the X-ray analyzer unit 24 may also be used to receive radio signals due to the wiring design. This is also shown in FIG. 4, which shows graphic image information 64, which is shown on the display unit 66 when the X-ray source 16 is deactivated, but the transmitter unit 42 is transmitting a radio signal. The lines may be used to identify a specific line structure, from which radio signal information may be taken. The disclosure uses this by creating the possibility of the X-ray detection unit 18 being used not only to detect X-ray radiation 14, but also to receive the radio signal 26.

For this purpose, the X-ray detection unit 18 has a switching unit 78 that may be realized using analog switches 80. One analog switch 80 is provided for each of the electrical wires 38. The electrical wires 38 are also connected via the switching unit 78 to further signal terminals 44, which are in turn connected to the radio analyzer unit 34. The switching unit 78 is controlled by an operating state signal 40 of the control unit 56 with regard to the switching states of the analog switches 80. The electrical wires 38 are electrically coupled with the radio analyzer unit 34 when the analog switches 80 are in the switched-on state. The radio analyzer unit 34 is electrically isolated from the electrical wires 38 when the analog switches 80 are in the switched-off state. This means the X-ray detection unit 18 may be used to receive the radio signal 26, particularly if no X-ray radiation 14 is being emitted by the X-ray source 16. The radio analyzer unit 34 receives a corresponding received signal 32 from the X-ray detection unit 18 and analyzes the signal so that the position and orientation of the endoscope 28 may be determined. The radio analyzer unit 34 delivers corresponding data to the control unit 56 so that the control unit 56 may transmit appropriately processed data to the display unit 66.

The photodiodes 36 may be embodied to have a base of amorphous silicon, for example.

Here, the transmitter unit 42 is integrated into the endoscope 28. In alternative embodiments, the transmitter unit 42 may also be connected to the endoscope 28 as a separate entity. The connection may be detachable.

It is particularly advantageous if the transmitter unit 42 may transmit an electromagnetic interference pattern. Frequencies may be used that are well received by the X-ray detection unit 18 in light of its design, with particular regard to wavelength. The position of the endoscope 28 in the space may be determined precisely by determining, inter alia, the intensity and field distribution of the radio signal 26. Consequently, the disclosure allows the components necessary for the detection and/or signal readout of X-ray images from the X-ray detection unit 18 to be used simultaneously also for radio reception. Both the X-ray detection and radio reception may be spatially resolved, which means that at least two measuring signals are available with differing spatial distribution of sensitivity, for instance.

The transmitter unit 42 may be configured to transmit the radio signal 26 in a pulsed and/or time-varying manner. A spatial emission pattern of radio propagation may also be used by an interference pattern being transmitted into the space, for example. Time synchronization between radio reception and X-ray detection may be provided, e.g., with the X-ray detection functionality not overlapping in time with the radio reception functionality.

It may be provided in another embodiment that the transmitter unit 42 is embodied to realize interference using multiple radio sources, so that an interference pattern may be transmitted into the space. The frequency may be adjustable or variable here, so that the interference pattern may be varied over time. In the case of signal analysis, (e.g., analysis of a corresponding received signal), the form of the interference pattern may be identified through corresponding analysis. Once the form and intensity of the interference pattern have been identified, this information may be used to determine the location of the treatment instrument in the space, (e.g., the endoscope 28).

In the case of a simple interference pattern, the distance between minima and maxima may increase approximately linearly with the distance from the transmitter, for example. Moreover, the intensity of magnetic fields, which couple inductively into the electrical wires 38 of the X-ray detection unit 18, decreases cubically with increasing distance in accordance with the Biot-Savart law, as confirmed with measurements and simulations.

As the electrical wires are arranged in a plane, corresponding frequencies of the interference pattern may be detected in different sections of the X-ray detection unit. The respective spacing of the transmitter unit 42 from this section of the X-ray detection unit 18 may be determined as a result. A variation in the frequency of the radio signal 26 may be used to determine how the interference patterns are changing or moving. This enables an overdetermination to be achieved, allowing the position of the treatment instrument 28 to be determined reliably even in the event of disruptions and/or signal reflections in the space.

It may be provided at certain times that both the X-ray source 16 and the transmitter unit 42 are deactivated. This facilitates the performance of a "dark image measurement" of the X-ray detection unit 18, in order to facilitate calibration or similar, for example, and/or only to detect a signal background, for instance. This may further improve the analysis. Thus, only a single dark image measurement needs to be performed to improve the analysis in relation to secondary X-ray radiation 20 and also in relation to radio reception. The dark image measurement may be performed regularly when the detector is operating, in order to detect a signal background that often changes over time because of fluctuating temperatures in the X-ray detection unit.

The disclosure is not restricted to use in X-ray computed tomography units. It may also be used in C-arm devices and systems. In contrast to the gantry, the C-arm is not able to turn through 360°. However, the C-arm may be used as an X-ray angiography system a same way to detect the antenna position in the object. This is particularly advantageous if an interventional procedure needs to be performed on the patient.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining a position of a treatment instrument to perform a treatment on an object, wherein an X-ray examination is performed on the object using an X-ray device, the method comprising:
   supplying a predefined X-ray radiation by an X-ray source of the X-ray device;
   exposing the object to the predefined X-ray radiation from the X-ray source;
   detecting, by an X-ray detection unit of the X-ray device, secondary X-ray radiation at least partially transmitted through the object, at least partially dispersed by the object, and/or partially absorbed by the object;
   providing, by the X-ray detection unit, at least one detector signal based on the detected secondary X-ray radiation;
   analyzing, by an X-ray analyzer unit, the at least one detector signal in order to determine a structure of the object at least in part;
   transmitting, by a transmitter unit of the treatment instrument, a radio signal;
   receiving the radio signal by a radio receiver unit, wherein the radio receiver unit provides at least one received signal as a function of the radio signal; and
   analyzing, by a radio analyzer unit, the at least one received signal in order to determine the position of the treatment instrument in relation to the object,
   wherein the X-ray detection unit is used as the radio receiver unit, and
   wherein the radio analyzer unit receives the at least one received signal from the X-ray detection unit.

2. The method of claim 1, wherein the X-ray detection unit has signal terminals for electrical coupling with the X-ray analyzer unit, to which the X-ray detection unit provides the at least one detector signal and the at least one received signal, and
   wherein the signal terminals are coupled at least temporarily at least with the X-ray analyzer unit and/or with the radio analyzer unit.

3. The method of claim 2, wherein the signal terminals are only coupled with the X-ray analyzer unit (in an initial operating state of the X-ray device, and
   wherein the signal terminals are only coupled with the radio analyzer unit in a second operating state of the X-ray device that is different from the initial operating state.

4. The method of claim 1, wherein the transmitter unit transmits the radio signal at one or more predefined frequencies.

5. The method of claim 4, wherein the one or more predefined frequencies is adjusted.

6. The method of claim 1, wherein the transmitter unit transmits the radio signal at multiple predefined frequencies.

7. The method of claim 6, wherein the transmitter unit varies a frequency of the radio signal within a predefined frequency range.

8. The method of claim 1, wherein the predefined X-ray radiation is supplied in at least an initial predefined period in which a transmission of the radio signal is halted, and/or
wherein the radio signal is transmitted in at least a second predefined period in which a supply of the predefined X-ray radiation is halted.

9. The method of claim 1, wherein the radio signal is transmitted at a different time than the supplying of the predefined X-ray radiation.

10. The method of claim 1, wherein the X-ray detection unit is moved at least partially in relation to the object, and
wherein the radio signal is detected at two or more different positions of the X-ray detection unit in relation to the object.

11. An X-ray device configured to expose an object to X-ray radiation, the X-ray device comprising:
an X-ray source configured to provide the X-ray radiation;
an X-ray detection unit configured to: (1) detect secondary X-ray radiation at least partially transmitted through the object, at least partially dispersed by the object, and/or partially absorbed by the object; and (2) provide at least one detector signal depending on the detected secondary X-ray radiation; and
an X-ray analyzer unit configured to analyze the at least one detector signal in order to determine a structure of the object at least in part,
wherein the X-ray detection unit is configured to receive a radio signal from a transmitter unit of a treatment instrument arranged in a predefined area of the object,
wherein the X-ray detection unit is configured to provide at least one received signal for analysis by a radio analyzer unit, and
wherein the radio analyzer unit is configured to analyze the at least one received signal in order to determine a position of the treatment instrument in relation to the object.

12. The X-ray device of claim 11, wherein the X-ray detection unit has photosensitive elements configured to be coupled at least selectively in part with the X-ray analyzer unit via electrical wires, and
wherein the X-ray detection unit configured to couple respective electrical wires with the radio analyzer unit.

13. The X-ray device of claim 12, wherein the X-ray detection unit is configured to couple the respective electrical wires with the X-ray analyzer unit or with the radio analyzer unit depending on an operating state.

14. The X-ray device of claim 13, wherein the X-ray detection unit is configured to couple the respective electrical wires with the X-ray analyzer unit or with the radio analyzer unit based on an operating state signal.

15. The X-ray device of claim 12, wherein the X-ray detection unit is configured to couple the respective electrical wires with the X-ray analyzer unit or with the radio analyzer unit based on an operating state signal.

* * * * *